United States Patent

Kreutz

[11] Patent Number: 5,938,152
[45] Date of Patent: Aug. 17, 1999

[54] CABLE TRANSIT

[75] Inventor: Tomas Kreutz, Lyckeby, Sweden

[73] Assignee: Roxtec AB, Karlskrona, Sweden

[21] Appl. No.: 08/817,111

[22] PCT Filed: Sep. 29, 1995

[86] PCT No.: PCT/SE95/01110

§ 371 Date: Apr. 7, 1997

§ 102(e) Date: Apr. 7, 1997

[87] PCT Pub. No.: WO96/11353

PCT Pub. Date: Apr. 18, 1996

[30] Foreign Application Priority Data

Oct. 6, 1994 [SE] Sweden .................................. 9403381

[51] Int. Cl.⁶ ...................................................... F16L 5/00
[52] U.S. Cl. ........................... 248/56; 248/68.1; 174/65 R; 277/630
[58] Field of Search .............................. 248/49, 56, 68.1; 174/48, 151, 65 R, 65 SS, 65 G; 277/626, 630, 644

[56] References Cited

U.S. PATENT DOCUMENTS

| 2,674,772 | 4/1954 | Jacobs ................................. 24/115 R |
| 2,732,226 | 1/1956 | Brattberg .............................. 285/192 |
| 3,282,544 | 11/1966 | Brattberg ............................. 248/56 |
| 4,733,016 | 3/1988 | Twist et al. ........................ 174/65 R |
| 4,767,086 | 8/1988 | Blomqvist ............................. 248/56 |
| 5,416,271 | 5/1995 | Birmingham et al. ............ 174/65 R |
| 5,675,128 | 10/1997 | Simon ................................. 174/152 G |

FOREIGN PATENT DOCUMENTS

| 2654806 | 6/1978 | Germany . |
| 3828012 | 1/1993 | Germany . |
| 217 276 | 11/1967 | Sweden . |
| 412820 | 3/1980 | Sweden . |

*Primary Examiner*—Ramon O. Ramirez
*Assistant Examiner*—Gwendolyn Baxter
*Attorney, Agent, or Firm*—Jacobson, Price, Holman & Stern, PLLC

[57] ABSTRACT

A cable transit includes an outer frame (10), at least one module-based cable seal, and a final seal which fills-out the frame together with the cable seal. The final seal includes two compressible wedges (11, 12) which can be moved towards an away from each other by a screw (17), and two further compressible wedges (15, 16) which can also be moved towards and away from each other and which coact with the two first wedges. The four wedges are held together by a movable strap (19) which holds the wedges so that they can move relative to one another, wherein the wedges and the screw (17) together form a contained component which can be easily fitted into the frame. The outer side of the flexible strap (19) is provided with guide shoulders (191 to 194) approximately opposite the further wedges (15, 16) for guiding the component to a correct position in the frame. The strap and the wedges are molded in one piece, and one end (51) of the strap is glued to the other end (52) thereof.

13 Claims, 2 Drawing Sheets

CABLE TRANSIT

TECHNICAL FIELD

The present invention relates to a cable transit which includes an outer frame, at least one module-based cable seal, and a final sealing means which fills-out the frame together with the cable seal. The final sealing means includes two compressible wedges which can be moved towards and away from each other by means of screw means, and two further compressible wedges which can also be moved towards and away from one another and which coact with the two first-mentioned wedges.

DESCRIPTION OF THE BACKGROUND ART

Sealing systems which seal and protect cable and pipe transits against fire, smoke, gas, water, etc., are known to the art; see for instance Swedish Patent Specification 217276. This publication illustrates and describes a cable transit in which several separate cables are sealingly fitted and which comprises a rigid frame which includes resilient packing pieces which function to firmly clamp the cables, and a combination of wedges which when pushed together exert pressure on the packing pieces, and a tensioning device which functions to lock the wedge combination. These and other present-day sealing systems comprise several different loose components and several working steps are required to assembly, fit and dismantle such systems, which, when taken together, make the work more complicated and lower the speed at which the work can be carried out.

The object of the present invention is to eliminate these drawbacks.

SUMMARY OF THE INVENTION

The present invention provides a cable transit of the aforedescribed kind in which the four wedges are held together by a flexible strap which is adapted to hold the movable wedges firmly in relation to one another, so that the wedges and the screw means will form together a contained component which can be easily fitted in the frame.

BRIEF DESCRIPTION OF THE DRAWINGS

The invention will now be described in more detail with reference to the accompanying schematic drawings, in which.

BEST MODES OF CARRYING OUT THE INVENTION

Figure 1:
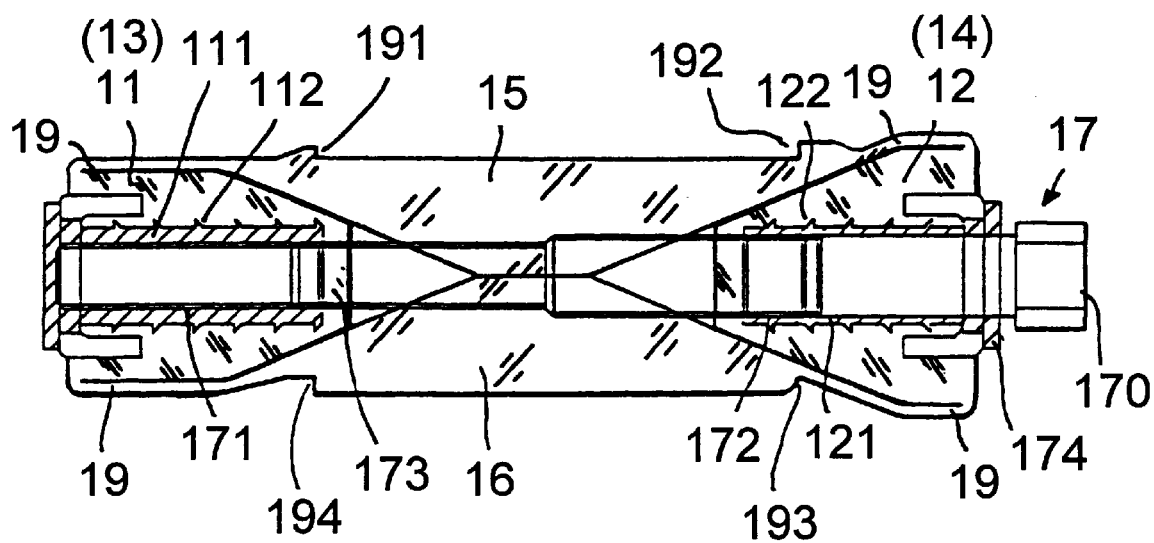
FIG. 1 illustrates a component prior to fitting the component in the frame (not compressed)

The component shown in FIG. 1 includes two compressible wedges 11, 12, e.g. rubber wedges, which can be moved towards and away from each other by means of screw means 17, and two further compressible wedges 15, 16 which can also be moved towards and away from each other and which coact with the two first-mentioned wedges 11, 12.

The screw means 17 comprises two threaded sleeves 111 and 121 which are molded in the wedges 11 and 12 respectively. The wedges are drawn together by means of a long screw 173 having a right-hand and a left-hand thread 171 and 172 respectively.

The four wedges 11, 12, 15, 16 and the screw means 17 are held together by a flexible strap 19 to form an easily handled pack with the wedges together forming a contained component which can be easily fitted into a frame.

Figure 2:
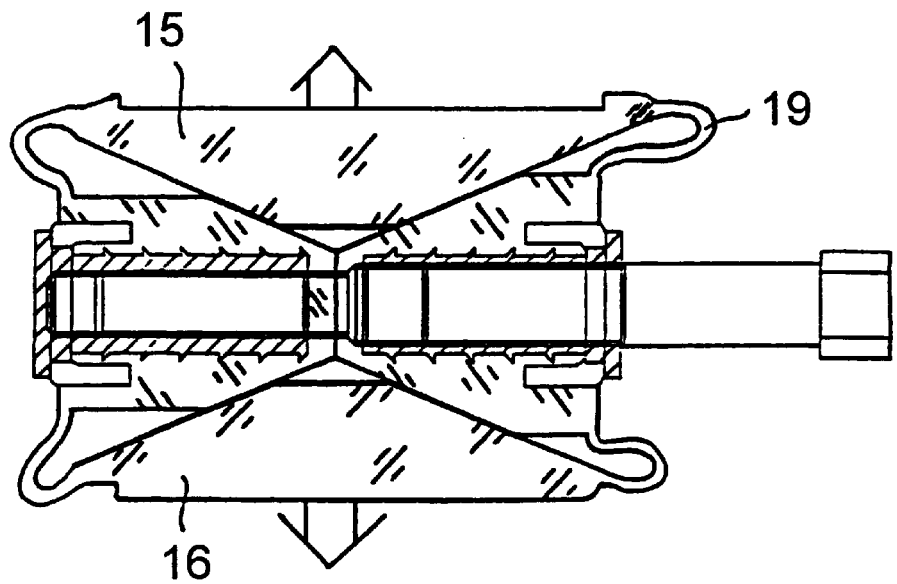
FIG. 2 shows the component compressed.
Figure 4:
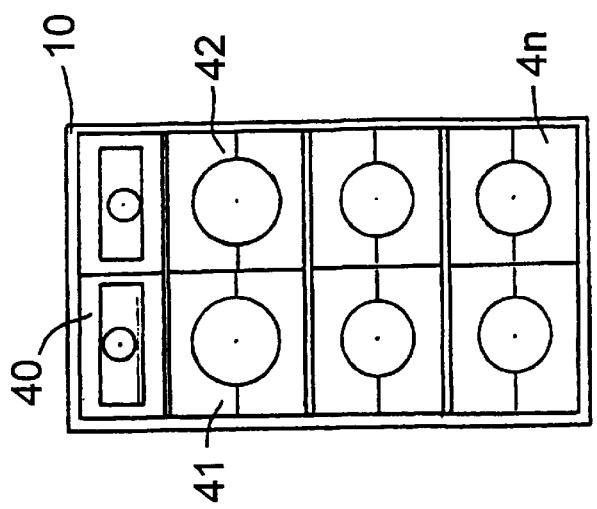
FIG. 4 shows the component inserted in a frame.

FIG. 2 shows the component shown in FIG. 1 after having been inserted into a frame, with all wedges being compressed as a result of tightening the screw means 17, whereby the wedge 15 presses against the frame (upwardly directed arrow) and the wedge 16 presses against an underlying cable seal (downwardly directed arrow) such as to obtain an effective seal. The frame and cable seals are shown in FIG. 4.

In a further development of the invention, the component includes two pairs of juxtaposed wedges which can be moved with the aid of a respective screw means 17 and 18 for each wedge pair 11, 12 and 13, 14 respectively. In FIG. 1, the wedge 13 can be considered to lie behind the wedge 11 and the wedge 14 to lie behind the wedge 12. The further wedges 15, 16 are then extended (at right angles to the plane of the drawing) to enable coaction with the two wedge pairs 11, 12 and 13, 14 respectively. The strap 19 will now have twice the width of the earlier strap, so as to be able to hold the six wedges together.

The arrangement of a front (11) and a rear (13) wedge in the aforesaid manner instead of only a single long wedge on each side is effective in avoiding locking due to skewing of the wedges as they are compressed.

FIG. 2 clearly shows the "bends" that occur in parts of the strap 19 as a result of the smaller circumference of the component caused by its compression. The strap 19 holds the entire pack together in the form of a unit and will entrain the upper wedge 15 and the lower wedge 16 when dismantling the pack.

Figure 3:
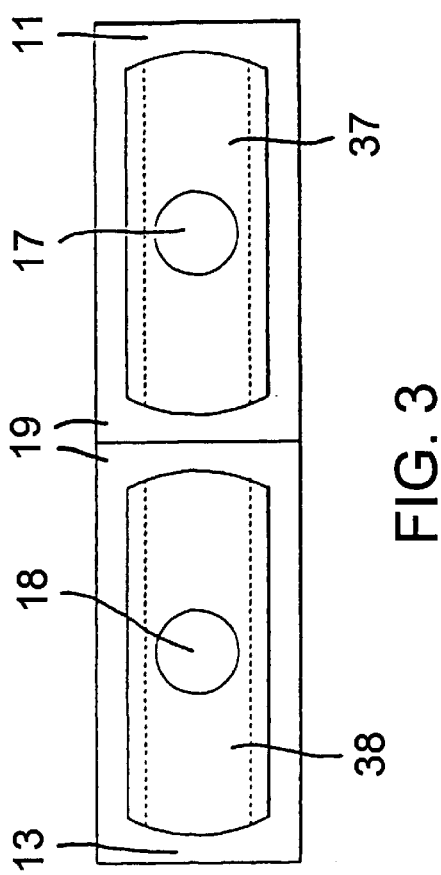
FIG. 3 shows the component in FIG. 1 from the rear.

FIG. 3 illustrates the screw means 17, 18, the common strap 19 and the two wedges 11 and 13. The arrangement includes a pressure distributing plate 37 beneath the screw means 17 and a corresponding pressure distributing plate 38 beneath the screw means 18, said plates functioning to distribute the pressure from the screw means uniformly over respective wedges. Unintentional disassembly of the arrangement is prevented by a stirrup-shaped locking device placed over the screw means.

FIG. 4 shows a frame 10 which includes a plurality of module-based cable seals 41, 42 . . . 4n and a final seal (component) 40 at the top of the frame.

It will be evident from the aforegoing that both compression and final sealing of the component are achieved quickly and in a simple fashion. The component is placed in its intended position in the frame as a unit and the two screws are tightened. No special tools are required for fitting or removing the component.

It is thought to be suitable to push the component into the frame on top of a support plate which covers the uppermost layer of modules in the frame. The two screws are tightened alternately, until the correct compression and tightness has been achieved.

As will be seen from FIG. 1, the screw means 17 includes two threaded sleeves 111, 121 for the wedges 11, 12 having a right-hand thread and a left-hand thread respectively, and a long screw 173 having a right-hand thread 171 and a left-hand thread 172 respectively, corresponding to the threads in the two sleeves. The thread located distal from the screw head 170 has a smaller diameter than the thread 172 which lies proximal to the screw head 170.

As will be seen from FIGS. 1 and 2, the outer surfaces of the sleeves 111, 121 are provided with grippers 112, 122.

The outer side of the flexible strap 19 is provided with guide shoulders 191, 192, 193, 194 approximately opposite the centre of the further wedges 15, 16, for guiding the component into its correct position in the frame 10.

Figure 5:
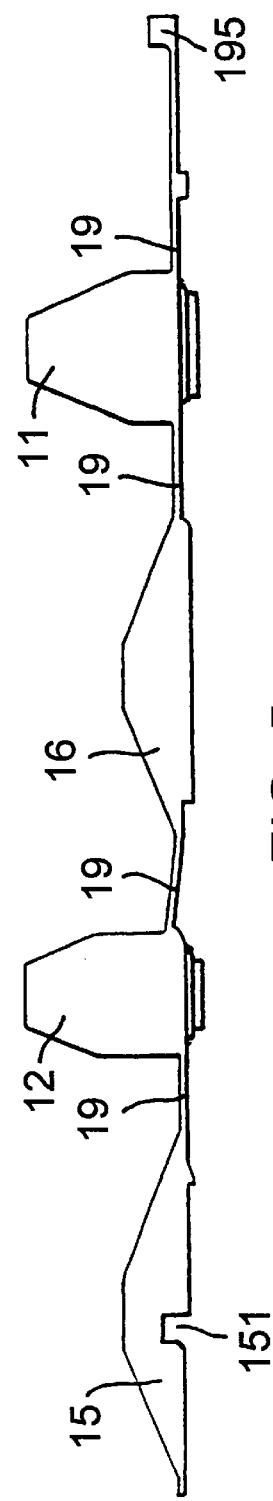
FIG. 5 shows the strap and wedges included in the component molded in one piece.

It may be to advantage to mould the strap and the wedges in a one-piece structure, see FIG. 5, which from left to right shows the wedge 15, the strap 19, the wedge 12, the strap 19, the wedge 16, the strap 19, the wedge 11 and the strap 19.

The strap section 19 furthest to the right is provided with a shoulder 195 which fits into a recess 151 in the wedge 15. Upon completion of the moulding process, the ends are glued together with the shoulder 195 inserted in the recess 151.

The wedges are suitably lubricated with a Teflon® solution.

In order to prevent the screw 173 from being completely unscrewed from the rear sleeve 111 when removing the component, which if allowed to happen would mean that the sleeve 111 would be obliquely positioned relative to the sleeve 121 to a greater or lesser extent, a plate 174, see FIG. 1, is conveniently placed between the plate 37, see FIG. 3, and the screw head 170. The plate may be a "snap-on" plate and has a thickness such that when the plate engages the head 170, at least one turn of the screw thread will remain in the sleeve 111.

As before mentioned, no special tool is required for fitting/removing the component. However, it may sometimes be of assistance to have available a tool which comprises two screw tighteners which are joined together mechanically and which fit on the screw heads of the screw means 17, 18. When fitting the component, one of the screws is tightened with a spanner, wherewith the other screw will be tightened at the same time. This saves time and guarantees an even and appropriate pressure. This particularly applies when the tool includes a slide coupling which is effective in stopping tightening of the screws when a maximum predetermined pressure has been reached.

It will be noted that because of the particular way in which the wedges are held together, the strap 19 will assist in drawing together the upper wedge (15) and the lower wedge (16) when removing the component, therewith greatly facilitating handling.

I claim:

1. A cable transit which comprises an outer frame, at least one module-based cable seal and a final seal which fills-out the frame together with the cable seal and which includes two first compressible wedges which can be moved towards and away from each other by a first screw, and two second compressible wedges which can also be moved towards and away from each other and which coact with the two first wedges, further comprising a flexible strap which holds the first wedges movably in relation to the second wedges, such that the first and second wedges and the first screw form a contained component which can be fitted easily into the frame.

2. The cable transit according to claim 1, wherein the contained component includes two third wedges which can be moved by a second screw, the third wedges juxtaposed with said first wedges, the two second wedges extendable to enable coaction with the first and third wedges.

3. The cable transit according to claim 1, wherein the first screw includes two threaded sleeves having a right-hand thread and a left-hand thread respectively, and a long screw having a right-hand thread and a left-hand thread corresponding to the respective threads of the two sleeves, wherein the right-hand thread of the long screw is located distal from a screw head and has a smaller diameter than the left-hand thread of the long screw, which is located proximal to said screw head.

4. The cable transit according to claim 3, wherein the sleeves are provided with grippers on respective outer sides.

5. The cable transit according to claim 3, wherein the sleeves are provided with grippers on respective outer sides.

6. The cable transit according to claim 3, wherein the sleeves are provided with grippers on respective outer sides.

7. The cable transit according to claim 1, wherein an outer side of the flexible strap is provided with guide shoulders approximately opposite the second wedges, for guiding the contained component to a correct position in the frame.

8. A cable transit which comprises an outer frame, at least one module-based cable seal and a final seal which fills-out the frame together with the cable seal and which includes two first compressible wedges which can be moved towards and away from each other by a first screw, and two second compressible wedges which can also be moved towards and away from each other and which coact with the two first wedges, further comprising a flexible strap which holds the first wedges movably in relation to the second wedges, such that the first and second wedges and the first screw form a contained component which can be fitted easily into the frame; wherein the first screw includes two threaded sleeves having a right-hand thread and a left-hand thread respectively, and a long screw having a right-hand thread and a left-hand thread corresponding to the respective threads of the two sleeves, wherein the right-hand thread of the long screw is located distal from a screw head and has a smaller diameter than the left-hand thread of the long screw, which is located proximal to said screw head, wherein the strap draws the two second wedges together at the same time the strap moves the first two wedges apart.

9. The cable transit according to claim 8, wherein the contained component includes two third wedges which can be moved by a second screw, the third wedges juxtaposed with said first wedges, the two second wedges extendable to enable coaction with the first and third wedges.

10. The cable transit according to claim 8, wherein an outer side of the flexible strap is provided with guide shoulders approximately opposite the second wedges, for guiding the contained component to a correct position in the frame.

11. A cable transit which comprises an outer frame, at least one module-based cable seal and a final seal which fills-out the frame together with the cable seal and which includes two first compressible wedges which can be moved towards and away from each other by a first screw, and two second compressible wedges which can also be moved towards and away from each other and which coact with the two first wedges, further comprising a flexible strap which holds the first wedges movably in relation to the second wedges, such that the first and second wedges and the first screw form a contained components which can be fitted easily into the frame; wherein an outer side of the flexible strap is provided with guide shoulders approximately opposite the second wedges, for guiding the contained component to a correct position in the frame.

12. The cable transit according to claim 11, wherein the contained component includes two third wedges which can be moved by a second screw, the third wedges juxtaposed with said first wedges, the two second wedges extendable to enable coaction with the first and third wedges.

13. The cable transit according to claim 11, wherein the first screw includes two threaded sleeves having a right-hand thread and a left-hand thread respectively, and a long screw having a right-hand thread and a left-hand thread corresponding to the respective threads of the two sleeves, wherein the right-hand thread of the long screw is located distal from a screw head and has a smaller diameter than the left-hand thread of the long screw, which is located proximal to said screw head.

* * * * *